(12) United States Patent
Mullaly (10) Patent No.: US 9,563,860 B2
(45) Date of Patent: Feb. 7, 2017

(54) SYSTEM AND METHOD FOR PROVIDING INTER-JURISDICTIONAL PERMITS

(75) Inventor: Mark S. Mullaly, Kennesaw, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 984 days.

(21) Appl. No.: 13/352,704

(22) Filed: Jan. 18, 2012

(65) Prior Publication Data

US 2013/0185172 A1 Jul. 18, 2013

(51) Int. Cl.
*G06Q 30/06* (2012.01)
*G06Q 10/06* (2012.01)
*G06Q 50/26* (2012.01)
*G06Q 30/08* (2012.01)

(52) U.S. Cl.
CPC .............. *G06Q 10/06* (2013.01); *G06Q 30/06* (2013.01); *G06Q 50/26* (2013.01)

(58) Field of Classification Search
CPC ................................ G06Q 30/06; G06Q 30/08
USPC ................................................ 705/26.1, 27.1
See application file for complete search history.

(56) References Cited

U.S. PATENT DOCUMENTS

| 7,831,628 | B1* | 11/2010 | Silva et al. .................. 707/802 |
| 2003/0101070 | A1 | 5/2003 | Mahosky et al. |
| 2003/0115198 | A1 | 6/2003 | Singer et al. |
| 2005/0278633 | A1* | 12/2005 | Kemp ........................... 715/713 |
| 2009/0094043 | A1* | 4/2009 | Leake et al. ...................... 705/1 |
| 2009/0132269 | A1 | 5/2009 | Perrill |
| 2010/0153151 | A1* | 6/2010 | Toenjes ............................ 705/7 |

OTHER PUBLICATIONS

MyBuildingPermit.com, 2008 [retrieved on Jan. 2, 2012]. Retrieved from the Internet: <URL: http://www.mybuildingpermit.com>.

* cited by examiner

*Primary Examiner* — James Zurita
(74) *Attorney, Agent, or Firm* — Greenberg Traurig LLP (57) ABSTRACT

Permit applications for construction or property improvement projects can be processed for multiple jurisdictions at the same time through a networked system. A kiosk can be provided as a central point of interaction for the user. A property address is received from the user and compared with multiple jurisdictions to determine one or more jurisdictions in which the property address is located. Permit requirement information for each of the jurisdictions is output for the user. Permit application information is then received from the user. The permit application information includes electronic fee payment information. A permit application can then be transmitted to at least one of the jurisdictions. If the permit is approved, one or more permits are received from the jurisdictions. The kiosk or other device can print paper copies of the permits for the user or provide them in electronic format.

5 Claims, 12 Drawing Sheets

Please enter the address of the property at which the work is to be done:

Street: [        ]
Street 2: [        ]
City: ▼   State: ▼   ZIP code: [    ]

Please select the type of project that you plan to work on at this address:

Project type: ▼
          86                87
                       ( Next )

PERMIT REQUIREMENTS:
Address: 123 Main Street, Anywhere, GA 12345
Project: Water heater replacement City of Anywhere, Dept. of Permits: ~102        106            110
  Electrical Permit ──▶ Add to Shopping Cart           Find out property history for
  Building Permit  ──▶ Add to Shopping Cart           123 Main Street, Anywhere,
  Gas Permit       ──▶ Add to Shopping Cart                     PA 12345

116 ─ ( Go back )
Somewhere County, Dept. of Permits: ~104   ~108
  Building Permit  ──▶ Add to Shopping Cart    118 ─ ( New search )

132 ─ ( Show Cart )

Checkout

Step1: Enter Information

Step1: Verify

Step1: Payment

Step1: Print & Save

City of Anywhere, permit application(s):

Electrical Permit
First name: John
Last name: Doe
Phone number: 404-555-5555
Street: 456 Peachtree
City: ▼  State: ▼  ZIP: 30999
Contractor name: John Doe
License No.: GA1234

Remove  Edit
  148     150

152 — Next

Shopping Cart:

Electrical Permit
Remove

Total: $30

Checkout

Step1: Enter Information

Step1: Verify

Step1: Payment

Step1: Print & Save

City of Anywhere, permit application(s):

Electrical Permit
Name: John Doe
Address: 456 Peachtree
         Anywhere, GA 30999

Enter credit card billing information:
First name:
Last name:
Street:
City: ▼  State: ▼  ZIP:
Payment Amount: $
Card Number:
Expiration: Month ▼  Year ▼

Cancel   Submit  — 158

Shopping Cart:

Electrical Permit
Remove

Total: $30

90 ↘
                92
        ADDRESS_A / ADDRESS_B ... ADDRESS_N

JURISDICTION_A | XXXXXX |        | ... |
JURISDICTION_B |        |        | ... |
      ⋮        |   ⋮    |   ⋮    | ... |   ⋮
JURISDICTION_M |        |        | ... |

FIG. 15

94 ↘
                96
        PROJECT_A / PROJECT_B ... PROJECT_N

JURISDICTION_A | XXXXXX |        | ... |
JURISDICTION_B |        |        | ... |
      ⋮        |   ⋮    |   ⋮    | ... |   ⋮
JURISDICTION_M |        |        | ... |

FIG. 16

SYSTEM AND METHOD FOR PROVIDING INTER-JURISDICTIONAL PERMITS

BACKGROUND

Municipalities such as towns and cities, as well as counties, states or other governmental jurisdictions commonly issue permits for construction and property improvement activities that have the potential to impact building safety, sanitation, environmental or other governmental concerns. Such a jurisdiction commonly requires a property owner or contractor who wishes to perform such a construction or property improvement activity to apply for and obtain a permit. For example, a city may require one to apply for and obtain a permit to repair or install plumbing lines and fixtures or electrical power wiring and devices in a home or other premises. Even relatively simple home improvement projects, such as the installation of a water heater, may require one or more permits from one or more jurisdictions. Such a home improvement project may require two or more types of permits, such as an electrical permit, a building permit, and a gas fitting permit.

The time-honored method of obtaining permits of the types described above involves the homeowner, contractor or other applicant visiting an office of the permit-issuing authority, filling out an application form, and submitting the form and an application fee. If the authority approves the application, the permit authority issues the permit in the form of a paper document. Improvements to this method have included on-line permit application systems that applicants can access via the Internet. Applicants can thus receive issued permits as electronic documents by e-mail or by downloading them from the system web sites. Applicants can print received permits in hardcopy form using a computer printer or store permits in electronic form on portable devices such as mobile smartphones and tablet computers.

To access an on-line permit application system of the type described above, the user generally must know or look up the name of the permit-issuing authority and know or look up the appropriate web site. Once logged into the appropriate web site, the user generally must know what type of permit is required, as such systems generally display a list of permit types from which the user is expected to choose. Although professional contractors may be familiar with permit types, a homeowner may be unsure of what types of permits are required and from what authority to seek them. Each jurisdiction that provides an on-line permit application system generally maintains its own web site for that purpose, and such web sites do not include references between each other. For example, an on-line permit application system maintained by a city generally does not refer the user to on-line permit application systems that may be maintained by the county in which that city is located.

Using the conventional method described above, a property owner, contractor or other prospective permit applicant must first identify each jurisdiction from which a permit might be needed for a particular project, then determine the authorities responsible for issuing such permits, and determine the type of permits offered by those authorities. The permit applicant may then determine which of these authorities offers an on-line permit application system and learn how to access and use each of them.

Another improvement has included an Internet-enabled kiosk installed in a home improvement store, through which applicants can access one such on-line permit application system operated by a municipal authority. Through an agreement between the provider of the kiosk and the municipal authority, the kiosk can electronically communicate with that authority's on-line permit application system to apply for a permit. The kiosk prompts the user to enter information including the user's name and address as well as the type of permit sought. The user can also enter payment information for the permit application fee, such as a credit card number. The kiosk forwards the permit application information, including the payment information, to the authority's permit application system via an Internet connection. If the permit application is approved, the kiosk receives the permit in electronic format and prints a copy of the permit that the user can take.

Another system is known in which a web site provides a single point of entry to the permit application systems of a group of nearby cities. A user can select a jurisdiction from a drop-down menu, and the system navigates the user's web browser to the permit application system of that jurisdiction.

It would be desirable to provide a permit application system that is easier and more convenient for property owners, contractors or other prospective permit applicants to use than conventional systems.

SUMMARY

Embodiments of the present invention relate to a system and method for electronically providing a permit issued by any of two or more different jurisdictions. In an exemplary embodiment, a property address is received via a user interface of an electronic system. The property address is compared with two or more jurisdictions to determine one or more permit-issuing jurisdictions in which the property address is located. Permit requirement information corresponding to each of the one or more permit-issuing jurisdictions is output via the user interface. Permit application information is then received via the user interface. The permit application information includes electronic payment information for the application fee charged by a permit-issuing authority. A permit application, including the permit application information, can then be transmitted to at least one of the one or more permit-issuing jurisdictions via the data network. When the permit is approved, one or more permits are received from the permit-issuing jurisdictions via the data network. The one or more permits are provided via the user interface, which can include printing a paper copy of a permit or providing a permit in electronic form.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
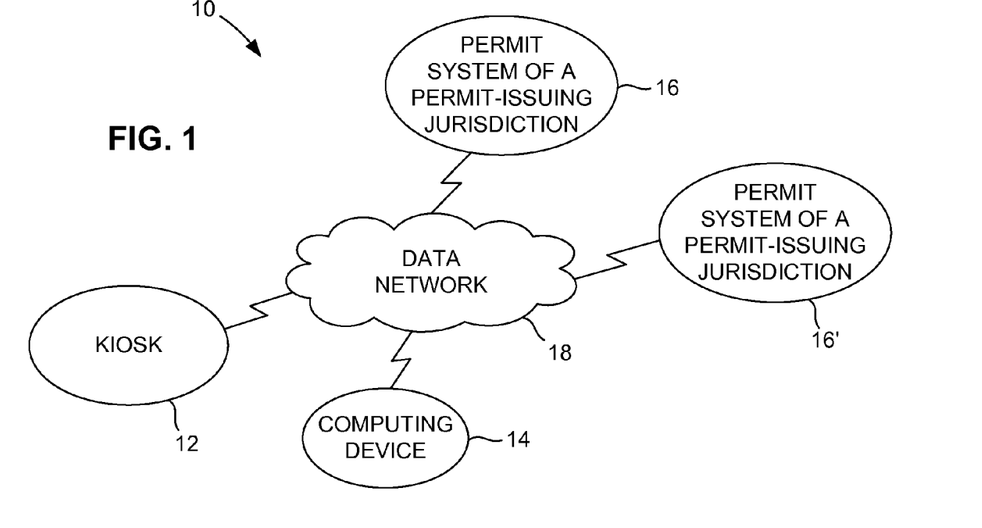
FIG. 1 is a schematic diagram of a system for providing inter-jurisdictional permits, in accordance with an exemplary embodiment of the invention.

As illustrated in FIG. 1, in an illustrative or exemplary embodiment of the invention, a networked system 10 includes at least one kiosk 12, at least one computing device 14 and two or more permit systems 16 of permit-issuing jurisdictions, all interconnected via a data network 18 such as the Internet. In other embodiments, either kiosk 12 or computing device 14 is included, but not both. In still other embodiments, a similar device having characteristics of both kiosk 12 and computing device 14 can be included. Kiosk 12 and computing device 14 can communicate data with any of permit systems 16 via any suitable combination of wired or wireless connections involving data network 18. The various permit systems 16 are operated by or under the authority of different governmental jurisdictions, such as municipalities, counties, etc., that commonly issue permits for construction or property improvement activities. As used herein, the term "permit" refers to a document or similar evidence, in any suitable format, including but not limited to electronic formats, evidencing a grant to a party of a jurisdiction's permission to perform a construction activity, property improvement activity, or similar activity of the type described herein.

Computing device 14 can be any suitable type of device through which a user can interact with a Web site, such as a mobile smartphone or similar portable computing device, or a desktop or laptop or similar computer. Although computing device 14 is not described in further detail, it should be understood that computing device 14 can operate in a manner similar to the manner described below in which kiosk 12 operates. Accordingly, the following description applies not only to kiosk 12 but also computing device 14. Persons skilled in the art to which the invention relates will readily be capable of adapting the system and method of the embodiment described below to an embodiment in which computing device 14 is operated instead of kiosk 12. In still other embodiments (not shown), a device such as computer, a mobile smartphone or a tablet computer can be used to remotely access kiosk 12 or a similar server computer (not shown) and allow the user to interact with such a kiosk or server computer in a manner similar to that described below.

Figure 2:
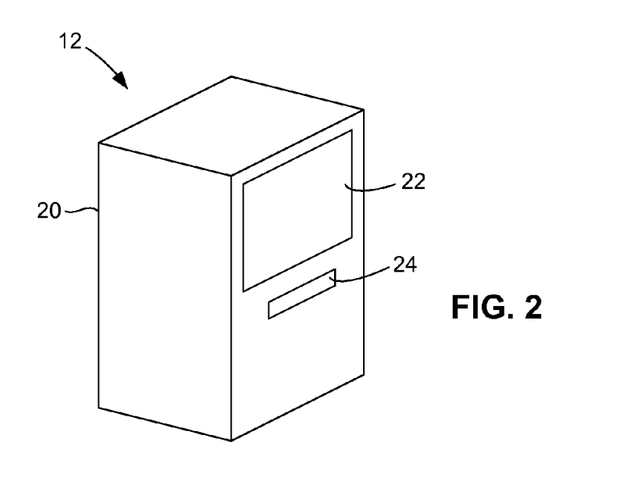
FIG. 2 is a generalized perspective view of a kiosk in the system of FIG. 1, in accordance with the exemplary embodiment.

As illustrated in FIG. 2, in the exemplary embodiment kiosk 12 can include a suitable housing 20, a touch-screen display 22 and a printer output port 24. As described below, kiosk 12 can provide permits for a user through printer output port 24. In an embodiment in which the user interface does not include a printer, such as an embodiment in which computing device 14 is, for example, a portable smartphone or tablet computer, permits can be provided in electronic format. Furthermore, as described below, using kiosk 12 a user can have system 10 transmit permits in electronic format to the user's phone or other portable computing device. Permits in electronic format may include, for example, Portable Document Format (PDF), which a user can display on the portable computing device or other computing device 14 or send to a printer for printing as a paper document.

Kiosk 12 can be located, for example, in a home improvement store. A homeowner or professional contractor can use kiosk 12 to obtain permits for a project during the same visit to the home improvement store in which the homeowner or contractor shops for materials needed for the project. A contractor can also conveniently use kiosk 12 to obtain multiple permits for multiple projects during the same visit to the store.

Figure 3:
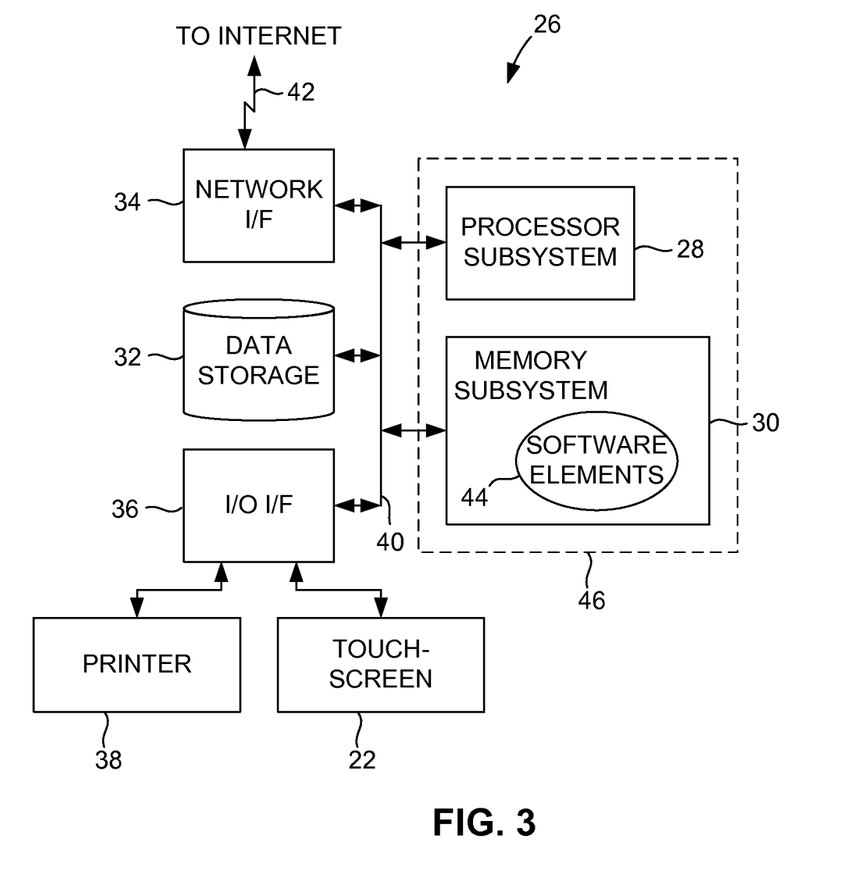
FIG. 3 is a block diagram of an electronic system of the kiosk of FIG. 2.

As illustrated in FIG. 3, kiosk 12 can comprise an electronic system 26 that is similar to, or based on, a personal computer system that has been suitably programmed or otherwise configured, as described below. Accordingly, electronic system 26 can include a processor subsystem 28, a memory subsystem 30, non-volatile data storage 32 (e.g., a hard disk drive, FLASH memory, etc.), a network interface 34, and an input/output (I/O) device interface (I/F) 36. Touchscreen display 22 and a printer 38 interface with the remainder of electronic system 26 via I/O device interface 36. In other embodiments, kiosk 12 can include hardware and software elements in addition to those described herein or that are different from those described herein. For example, a separate keyboard and display screen can be used instead of touchscreen display 22, which integrates the user input and user output functions. The above-described elements can communicate with one another via a digital bus 40. Electronic system 26 can communicate with the above-described data network 18 (FIG. 1) via a network connection 42, such as a connection to the Internet.

Memory subsystem 30 is generally of a type in which software elements, such as data and programming code, are operated upon by processor subsystem 28. In accordance with conventional computing principles, processor subsystem 28 operates in accordance with software elements 44. Although software elements 44 are conceptually shown for purposes of illustration as stored or residing in memory subsystem 30, persons skilled in the art to which the invention relates can appreciate that such software elements may not reside simultaneously or in their entireties in memory subsystem 30 but rather may be retrieved in portions on an as-needed basis, e.g., in code segments, files, modules, objects, data structures, instruction-by-instruction, or any other suitable basis, from data storage 32 or other suitable source (e.g., via network connection 42).

It should be noted that, as programmed or otherwise configured in accordance with software elements 44, the combination of processor subsystem 28, memory subsystem 30 (or other element or elements in which software is stored or resides) and any related elements generally defines a programmed processor system 46. As described below, in the exemplary embodiment programmed processor system 46 is programmed and otherwise configured to effect the exemplary methods described below with regard to FIG. 4 and FIG. 5 (i.e., 5A-5C). It should also be noted that the combination of software elements and the medium on which they are stored or in which they reside (e.g., memory subsystem 30, data storage 32, or any other non-transitory computer-readable medium) generally constitutes what is referred to in the patent lexicon as a "computer program product."

Figure 4:
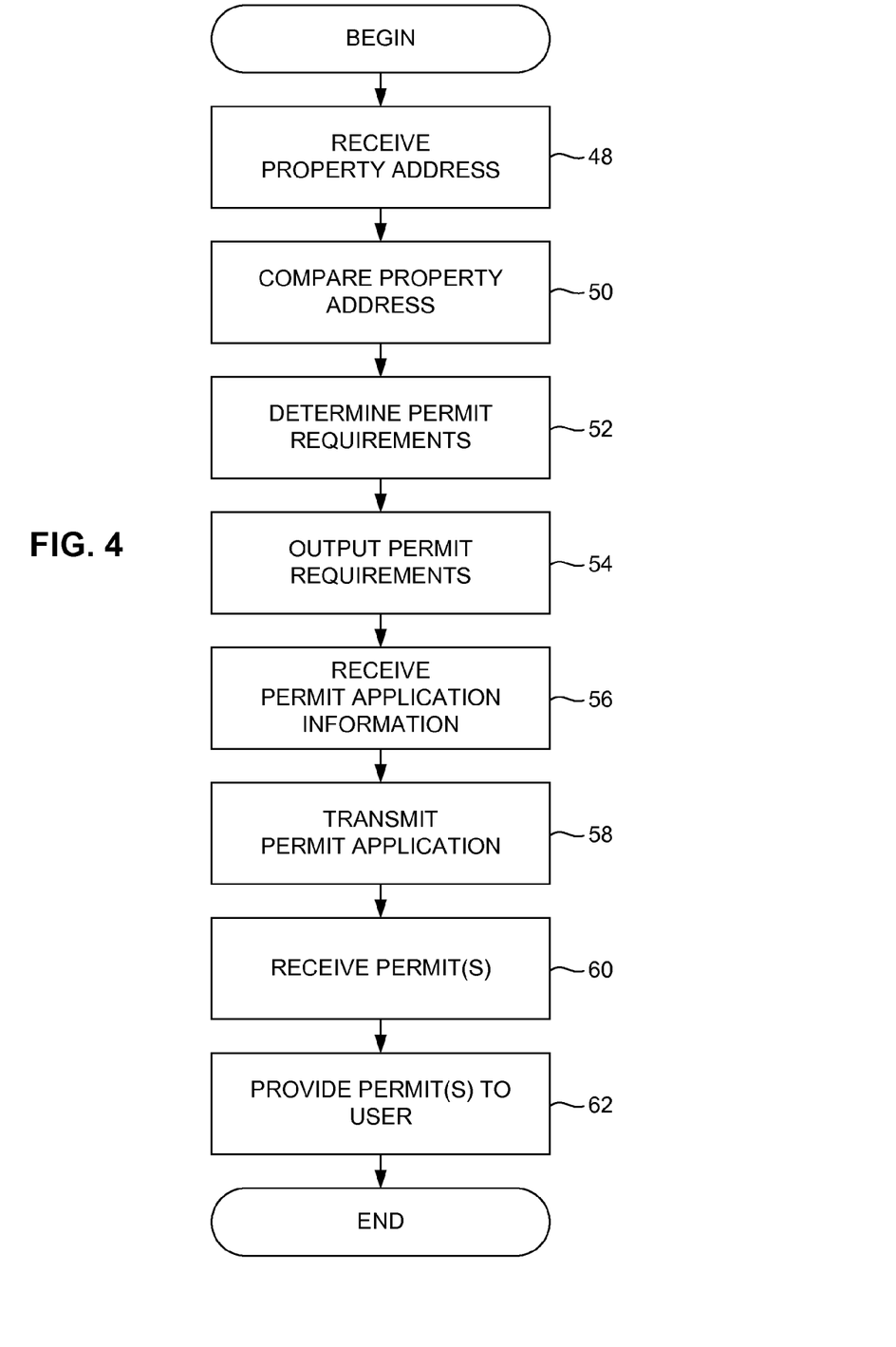
FIG. 4 is a generalized flow diagram of a method for providing inter-jurisdictional permits, in accordance with an exemplary embodiment of the invention.

As programmed with software elements 44 or otherwise configured in accordance with the exemplary embodiment of the invention described herein, processor system 46 can effect the methods of operation described below with regard to FIGS. 4 and 5. The method described below with regard to FIG. 4 is generalized for purposes of clarity. A method that includes additional features is then described below with regard to FIG. 5. In view of the descriptions herein, persons skilled in the art to which the invention relates will readily be capable of generating or otherwise providing suitable software and hardware elements to effect the methods described below with regard to FIGS. 4 and 5.

As illustrated in FIG. 4, a property address is received via a user interface, as indicated by block 48. The user interface can comprise elements of kiosk 12 (FIGS. 2-3) such as touchscreen display 22. That is, the user can enter the property address using touchscreen display 22. As the manner in which a touchscreen display-based user interface can be used to enter text and perform other graphical user interface functions such as activating buttons and hyperlinks is conventional and well understood in the art, such details are not described herein. For example, to facilitate text entry, a virtual or graphical keyboard (not shown) can be displayed on touchscreen display 22.

As indicated by block 50, the property address that the user entered is then compared with information corresponding to a number of geographic jurisdictions to determine one or more permit systems 16 of permit-issuing jurisdictions (FIG. 1). A permit-issuing jurisdiction is a jurisdiction that generally issues permits for the type of construction or property improvement work the user may perform on the property at the address the user entered. Note that the property address may be located within multiple permit-issuing jurisdictions 16. For example, a property address may be located within a city, which may be located within a county, where both the city and county generally issue permits for construction or property improvement projects. Some or all of information against which the property address is compared may be stored locally in electronic system 26 (FIG. 3) or, alternatively or in addition, may be electronically retrieved from permit application systems (not shown) of permit-issuing jurisdictions 16 (FIG. 1) via data network 18. Note that the comparison may be performed in whole or part locally in electronic system 26 or, alternatively, in whole or part remotely on (e.g., a server of) a permit application system of a permit system 16 or other remote electronic system and the results of the comparison returned to electronic system 26 via data network 18.

As indicated by block 52, the results of the comparison described above with regard to block 50 are used to determine permit requirements. Each permit-issuing jurisdiction may have its own permit requirements that are independent of permit requirements of other permit-issuing jurisdictions. As well understood by persons skilled in the art, permit requirements may range from little more than the applicant's or property owner's name and address to detailed information about the work proposed to be performed on the property. A jurisdiction may offer multiple types of permits. For example, a jurisdiction may offer an electrical permit for performing electrical work on electrical power wiring and equipment, a building permit for general construction and improvement work, a gas fitting permit for performing work on gas supply lines and equipment, a remodeling permit for performing remodeling work on a property, etc.

As indicated by block 54, permit requirement information for the one or more permit-issuing jurisdictions is then output for the user via the user interface. For example, the permit requirements can be displayed on touchscreen display 22. The permit requirement information that is output may include all of the permit types offered by all jurisdictions, only a subset of permit types offered by all jurisdictions, only a subset of permit types offered by only a subset of the jurisdictions, or any other suitable set of permit requirement information. The output may include all of the information that a jurisdiction considers in assessing whether to grant a permit, only a subset of such information, or no such information. For example, the permit requirement information that are output may include only the names of the permits offered (e.g., "Electrical Permit") and the fees charged by the jurisdictions for those permits.

As indicated by block 56, permit application information is then received via the user interface. For example, a user can enter permit application information, such as selections of which permit or permits the user wishes to obtain, the user's name, address, payment information (e.g., credit card number), etc., using touchscreen display 22.

As indicated by block 58, a permit application including the permit application information is then transmitted to one or more of the permit systems 16 via data network 18 (FIG. 1). In the exemplary embodiment, the network connection between kiosk 12 and permit systems 16 enables this permit application information to be transmitted.

In response to processing a permit application received by a permit system 16, a permit can be received from the permit-issuing jurisdiction via data network 18, as indicated by block 60. That is, any of permit systems 16 can transmit a permit to kiosk 12 via data network 18. As noted above, the permit can comprise, for example, a data file such as a PDF document.

As indicated by block 62, one or more permits can then be provided via the user interface. For example, printer 38

(FIG. 3) can print a hardcopy of the permit, which is output from kiosk 12 via printer output port 24 (FIG. 2).

Figure 5A:
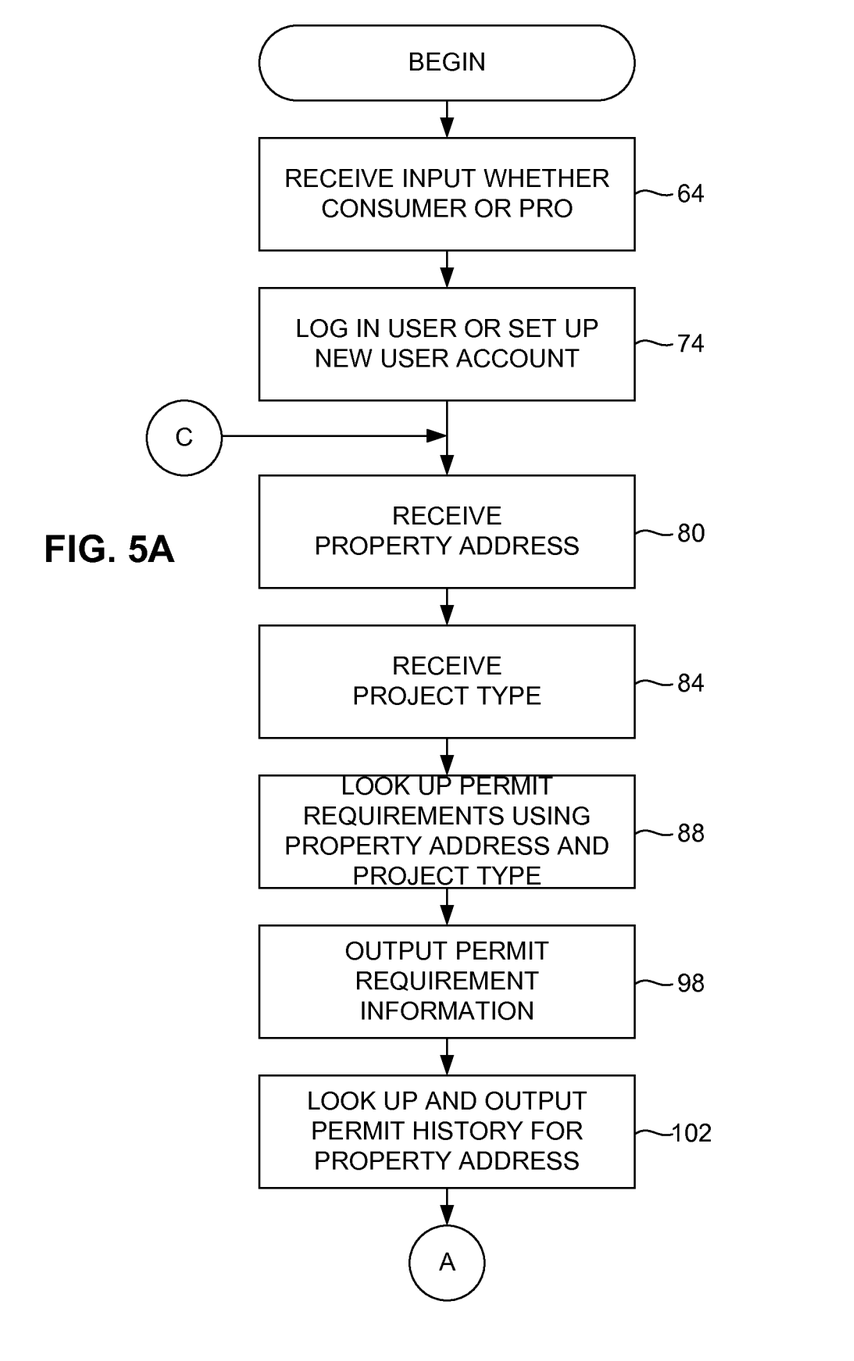
FIG. 5A is a flow diagram of another method for providing inter-jurisdictional permits, in accordance with another exemplary embodiment of the invention.
Figure 5B:
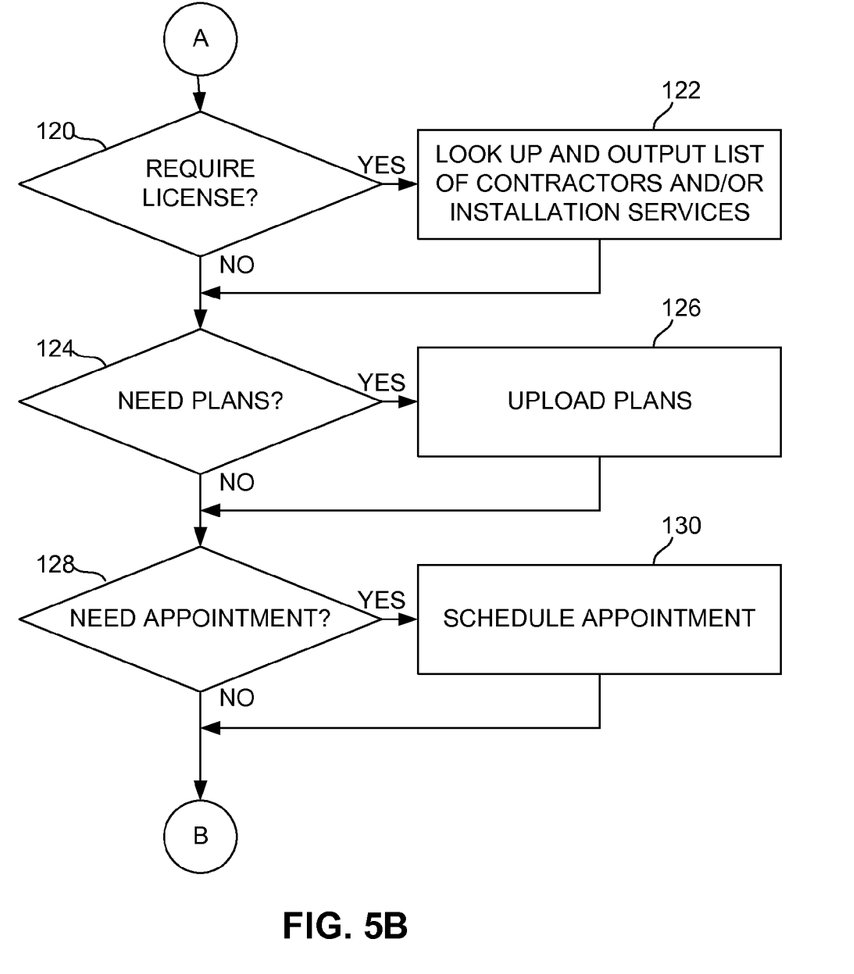
FIG. 5B is a continuation of the flow diagram of FIG. 5A.
Figure 5C:
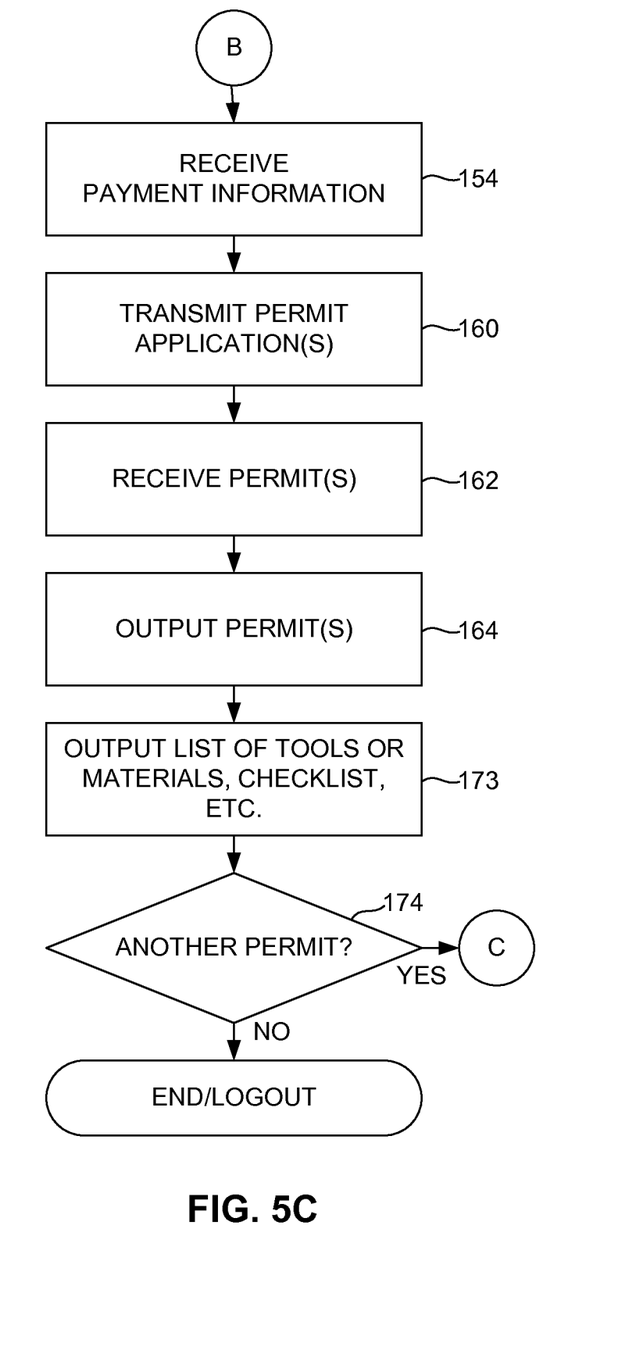
FIG. 5C is a continuation of the flow diagram of FIGS. 5A-B.

A method of operation in an embodiment having additional features is illustrated by the flow diagram of FIG. 5. In this embodiment, the method assists a user who may not know what types of permits are needed for a particular type of project. The method also distinguishes between users who are ordinary consumers (e.g., homeowners) and users who are professional (licensed) contractors. Still other embodiments can be provided that include subsets of the features described herein or that include some or all of the features described herein in combination with still other features. For example, in another embodiment (not shown), a similar method can be employed for interacting only with professional contractors and not ordinary consumers. It should be noted that although the method is described with regard to an exemplary sequence of discrete actions (as indicated for purposes of clarity by the blocks of the flow diagram), in other embodiments the actions can occur in any other suitable order and can occur in combination with other actions or portions of other actions in any suitable manner.

Figure 6:
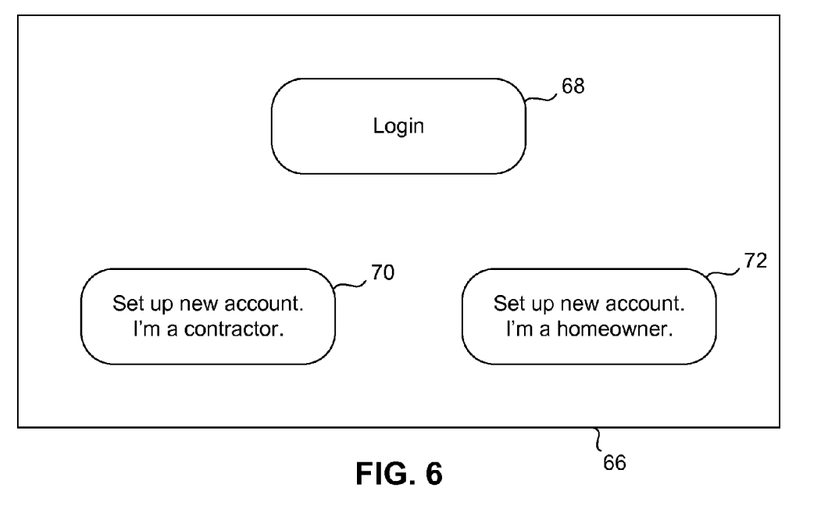
FIG. 6 is an exemplary screen display illustrating an initial state of a user interface, in accordance with the exemplary method of FIGS. 5A-C.

As indicated by block 64, kiosk 12 may prompt the user to indicate whether the user is a consumer or professional contractor. For example, a screen display 66 such as that shown in FIG. 6 may be output on touchscreen display 22. By touching a Login button 68 (FIG. 6), kiosk 12 guides the user through entering the user's username, password or other such information to log the user into an account previously set up by the user. As such login procedures are well understood in the art, they are not described in further detail herein. Alternatively by touching a button 70 the user can indicate that the user would like to set up such an account and that the user is a contractor. Similarly, by touching a button 72 the user can indicate that the user would like to set up such an account and that the user is an ordinary consumer such as a homeowner.

Figure 7:
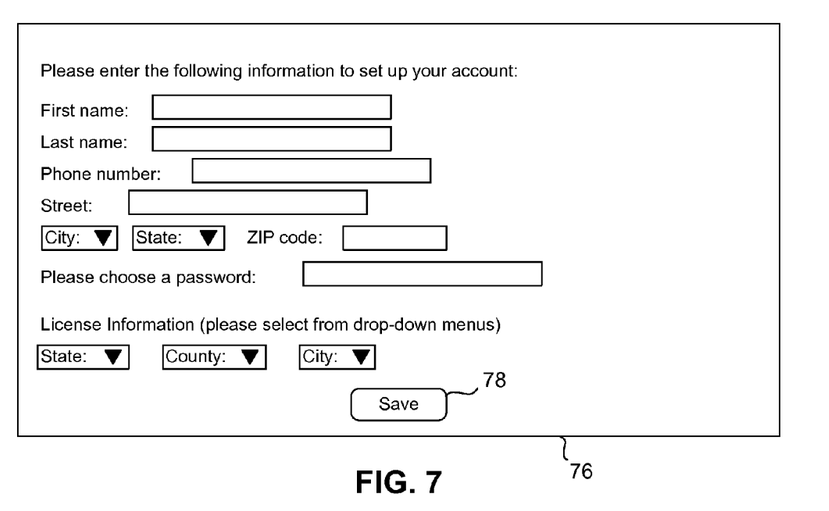
FIG. 7 is an exemplary screen display illustrating state of a user interface in which an account is set up, in accordance with the exemplary method of FIGS. 5A-C.

As account setup procedures (indicated by block 74, FIG. 5) are well understood in the art, they are not described in detail herein. The exemplary screen display 76 shown in FIG. 7 indicates some exemplary information that a user can enter to define an account, such as a name, address, e-mail address, password, etc. Exemplary screen display 76 prompts the professional contractor to enter license information, but such prompts are omitted in an instance in which the user is an ordinary consumer rather than a professional contractor. In response to the user touching a Save button 78, kiosk 12 creates the account.

As indicated by block 80, a property address is received via the user interface in the manner described above with regard to block 48 of FIG. 4. The exemplary screen display 82 shown in FIG. 8 indicates some exemplary information that a user can enter to indicate a property address, such as a street address (e.g., street name and house number), city, state, postal code, etc.

Figure 8:
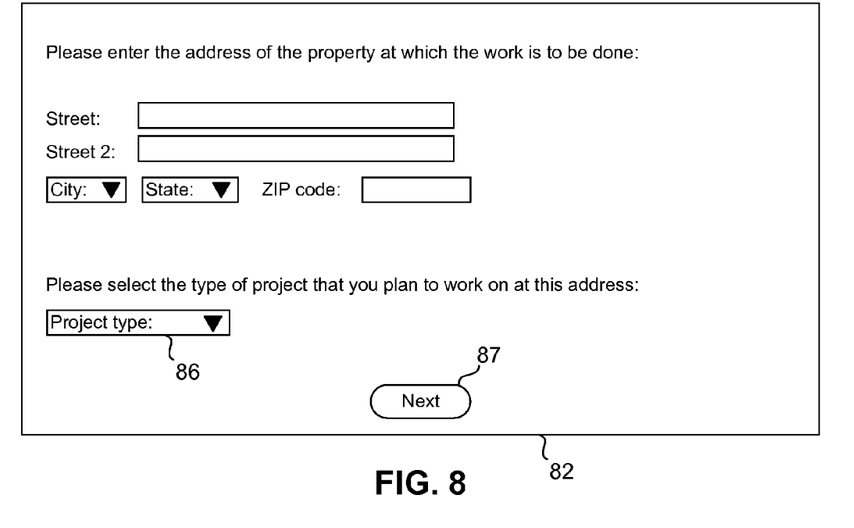
FIG. 8 is an exemplary screen display illustrating a state of a user interface in which a property address is entered, in accordance with the exemplary method of FIGS. 5A-C.

As indicated by block 84, project type information can also be received. For example, a user can select a project type from a pull-down menu 86 (FIG. 8). Menu options (not shown) listed on pull-down menu 86 can include, for example, project types such as "Bathroom Redesign," "Water Heater Installation," etc. Alternatively, or in addition, a free-form search feature (not shown) can be provided in which text entered by the user is parsed and searched for keywords such as "bathroom" or "heater" to aid determination of a project type. In response to the user touching a Next button 87, the method continues in the following manner.

As indicated by block 88, kiosk 12 looks up permit requirements in a database using the property address or the property address in combination with the project type. As described above with regard to block 50 in FIG. 4, comparisons involving permit-issuing jurisdictions 16 (FIG. 1) may occur in whole or part locally in kiosk 12 or in whole or part remotely in a server computer or similar remote system. Databases that can be used for such comparisons or look-up functions are known. Many jurisdictions and other governmental authorities and commercial services provide on-line (i.e., Internet) access to property records, plat maps and graphical information system (GIS) map databases that indicate jurisdictions in which properties are located.

The term "database" is used generally herein to refer to any suitable data repository and is not limited specifically to a relational database. For example, a lookup table 90 of the type shown in FIG. 15 in which the rows represent permit-issuing jurisdictions and the columns represent property addresses may be used. In response to a property address, lookup table 90 indicates the one or more jurisdictions in which the property is located. Information 92 provided in the body of lookup table 90 indicates whether the jurisdiction generally issues permits for building, construction, home improvement activities of the type to which the systems and methods described herein relate.

Figure 15:
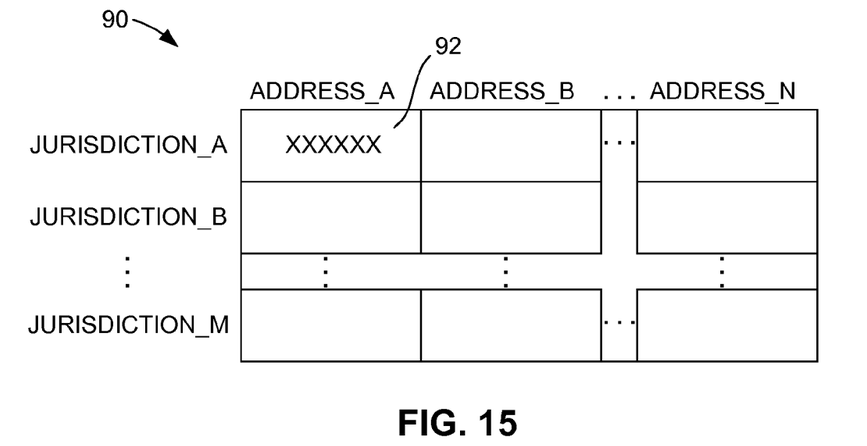
FIG. 15 illustrates an exemplary lookup table that provides correspondences between property addresses and jurisdictions in an exemplary system.
Figure 16:
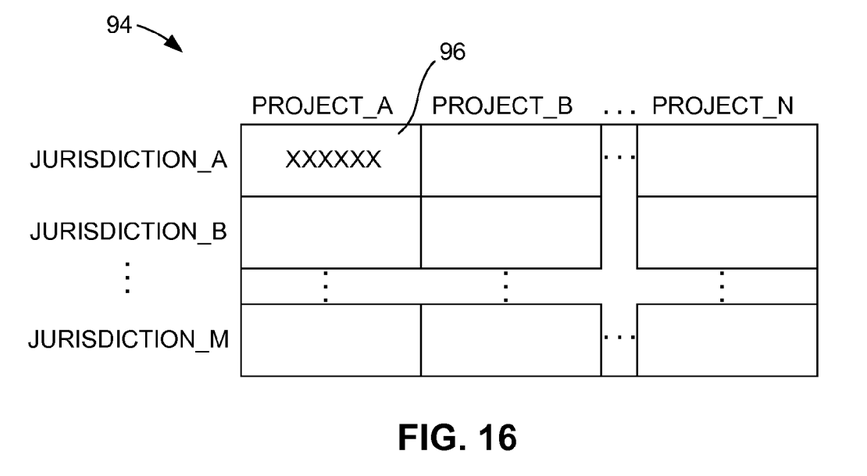
FIG. 16 illustrates another exemplary lookup table providing correspondences between projects and jurisdictions in an exemplary system.

Another exemplary type of lookup table 94 is shown in FIG. 16 that may be used in conjunction with lookup table 90. In lookup table 94 the rows represent permit-issuing jurisdictions and the columns represent project types. Information 96 provided in the body of lookup table 94 indicates the permit types that a particular jurisdiction (as represented by a column) requires for a particular project (as represented by a row). Permit requirement information corresponding to the indicated permit types can be included in information 96 or, alternatively, can be obtained from still other lookup tables or other databases (not shown).

As indicated by block 98, permit requirement information is output as described above with regard to block 54 in FIG. 4. The exemplary screen display 100 shown in FIG. 9 indicates permit-issuing jurisdictions 102 (e.g. a city), 104 (e.g., a county), etc., and respective permit requirement information 106, 108, etc., for those jurisdictions. For example, permit requirement information 106 indicates three types of permits are required by the city in which the property is located: an electrical permit, a building permit, and a gas permit. Permit requirement information 108 indicates that one type of permit is required by the county in which the property is located: a building permit. Such permits may be required, for example, in an instance in which the project type is a water heater replacement, as replacing a residential water heater may involve disconnecting and reconnecting a gas line and electrical wiring. These requirements are intended only as examples, and persons skilled in the art will be familiar with the types of permits commonly offered by jurisdictions for common types of projects. Also, although only the permit type (or permit name) is shown in exemplary screen display 100, the permit requirement information that is displayed in other embodiments may include additional detail or other information relating to what each jurisdiction requires.

Figure 9:
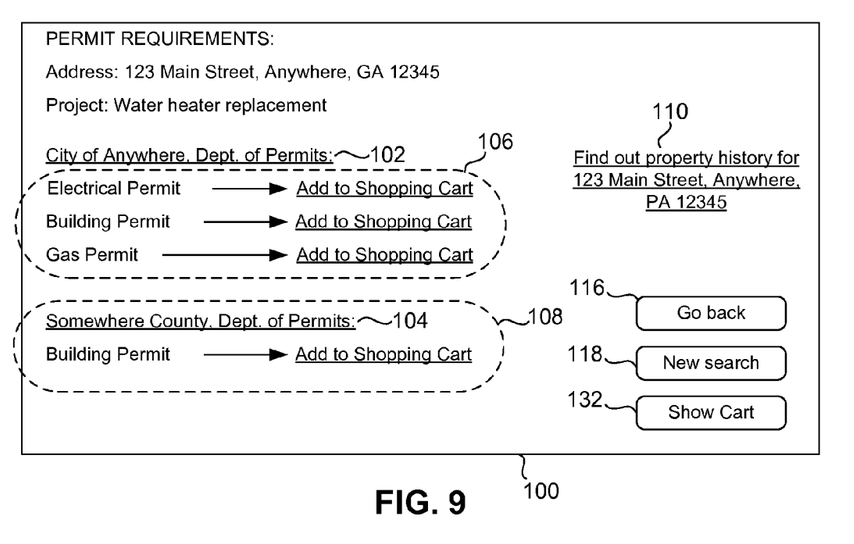
FIG. 9 is an exemplary screen display illustrating a state of a user interface in which permit requirement information is output, in accordance with the exemplary method of FIGS. 5A-C.

Note that in response to a user touching one of the permit names under one of the jurisdictions, kiosk 12 adds the permit to the user's shopping cart. As well understood in the art, a shopping cart in the context of on-line shopping is a colloquial term that is used to indicate a list of items that the on-line shopper intends to purchase. That is, a shopping cart is a metaphor for the list of items that the user has indicated the user intends to purchase.

In accordance with another feature of the method, indicated by block 102 in FIG. 5, a permit history (not shown) for a property can be looked up and displayed on touchscreen display 22 in response to a user touching a link 110 on display screen 100 (FIG. 9). The permit history can indicate all of the permits that a permit-issuing jurisdiction has previously issued for a property. This permit history can aid a user in various ways, such as in ascertaining the permit application information described above with regard to block 56 of FIG. 4.

Figure 10:
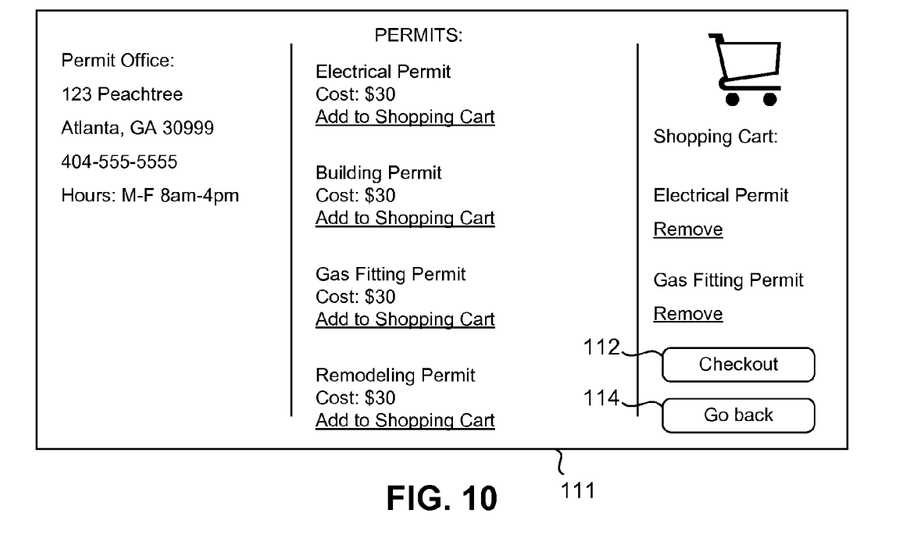
FIG. 10 is an exemplary screen display illustrating a state of a user interface in which permits offered by a jurisdiction are displayed, in accordance with the exemplary method of FIGS. 5A-C.

In response to a user touching one of the links 102 and 104 in screen display 100 (FIG. 9) that indicate the permit-issuing jurisdictions 16 in which the property is located, kiosk 12 may display a complete list of permits offered by the selected jurisdiction. An exemplary screen display 111 is shown in FIG. 10. Screen display 111 also indicates the contents of the user's shopping cart and the total of the permit fees charged by the jurisdictions for the permits in the user's shopping cart. In response to a user touching a Checkout button 112, kiosk 12 proceeds to gather payment information from the user as described below. In response to the user touching a Go Back button 114, kiosk 12 returns the user interface to screen display 100 (FIG. 9). In response to a user touching a similar Go Back button 116 in screen display 100, kiosk 12 returns the user interface to screen display 82 (FIG. 8), where the user can make corrections to the information that was entered. Similarly, in response to a user touching a New Search button 118, kiosk 12 returns the user interface to screen display 82 and allows the user to enter another address and thus select permits for another property or project.

In accordance with another feature of the exemplary method, indicated by block 120 in FIG. 5, it can be determined whether a particular permit-issuing jurisdiction requires the applicant to be a licensed contractor in order to issue the permit (or, in the industry vernacular, to "pull the permit"). If the user is not a licensed contractor, kiosk 12 can display (not shown) a list of licensed contractors, as indicated by block 122 or provide information regarding installation or other services that the home improvement store in which kiosk 12 is located may offer.

In accordance with still another feature of the exemplary method, indicated by block 124 in FIG. 5, it can be determined whether a particular permit-issuing jurisdiction requires the applicant to provide plans or drawings relating to the project. Kiosk 12 can guide the user (not shown) through a procedure in which the user uploads plans in electronic format to the appropriate permit system 16, as indicated by block 126.

In accordance with still another feature of the exemplary method, indicated by block 128 in FIG. 5, it can be determined whether a particular permit-issuing jurisdiction requires the applicant to have an inspector visit the property or have the applicant visit an office of the permit-issuing jurisdiction. Kiosk 12 can guide the user through a procedure in which the user schedules such an appointment with the permit-issuing jurisdiction, as indicated by block 130.

Figure 11:
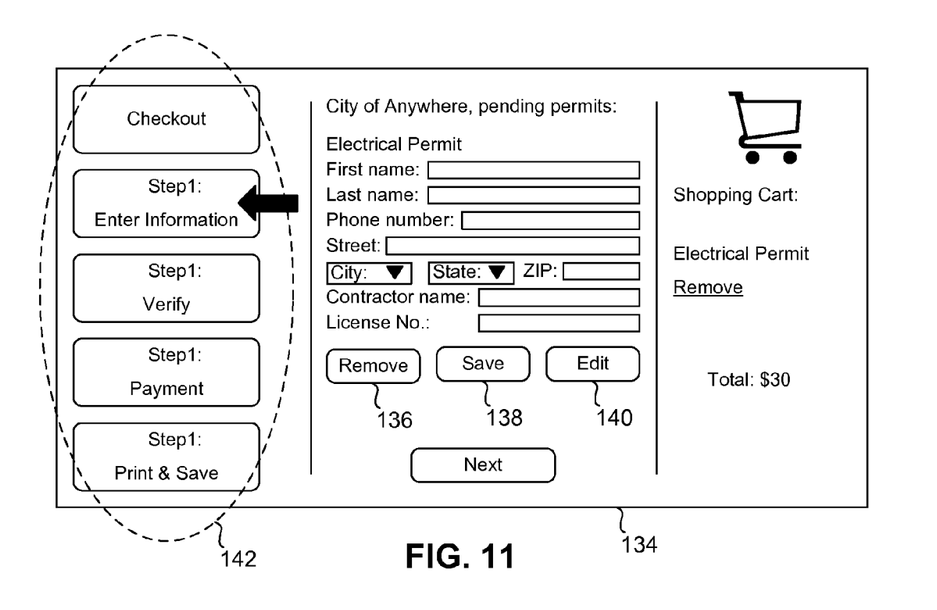
FIG. 11 is an exemplary screen display illustrating a state of a user interface in which permit application information is entered, in accordance with the exemplary method of FIGS. 5A-C.

In response to a user touching a Show Cart button 132 on screen display 100 (FIG. 9) or touching the Checkout button 112 on screen display 111 (FIG. 10), kiosk 12 displays the screen display 134 in FIG. 11, which indicates the contents of the user's shopping cart. Respective buttons 136, 138 and 140 may be provided to facilitate the user removing an item (i.e., a permit application) from the shopping cart, saving an item to the shopping cart after the user has made changes to the information entered, and edit or make changes to the information entered. A graphical icon 142 indicates the stage of the checkout process to which the user has progressed. Display screen 134 indicates the initial stage of the checkout process, in which the user enters permit application information of the type described above with regard to block 56 of FIG. 4. Note that the exemplary permit application information that a user can enter in display screen 134 includes the name and license number of a licensed contractor. Such contractor information would be omitted from such a display screen in an instance in which the user is an ordinary consumer. To avoid unnecessary duplication, such a consumer-oriented display screen is not shown. When a user has entered the permit application information for each permit type that the user wishes to purchase from the various permit-issuing jurisdictions 16 and made and saved any desired corrections to the entered information, the user can touch a Next button 144. In response to the user touching Next button 144, kiosk 12 proceeds to have the user verify the entered information and to obtain payment information from the user.

Figure 12:
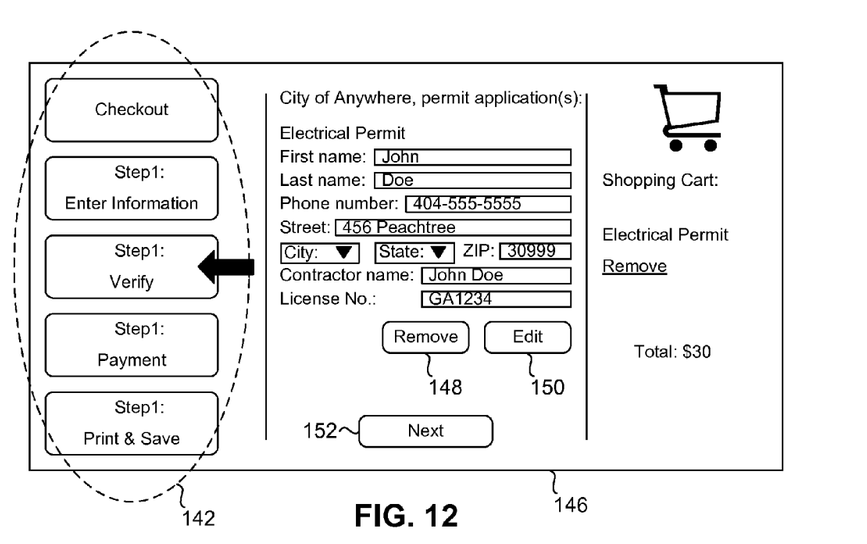
FIG. 12 is an exemplary screen display illustrating a state of a user interface in which permit application information is verified, in accordance with the exemplary method of FIGS. 5A-C.

An exemplary display screen 146 is shown in FIG. 12 through which kiosk 12 can have the user verify the entered permit application information. Respective Remove and Edit buttons 148 and 150 may be provided to facilitate the user removing an item (i.e., a permit application) from the shopping cart and editing or making changes to the information entered. Note that in display screen 146, graphical icon 142 indicates this verification stage of the checkout process. In response to the user touching another Next button 152, kiosk 12 proceeds to obtain payment information from the user. Receiving electronic payment information from the user is indicated by block 154 in FIG. 5.

Figure 13:
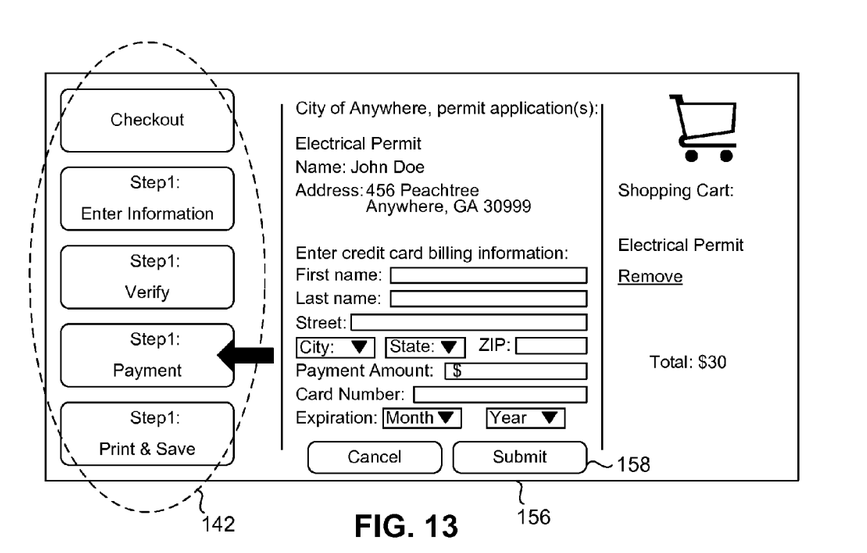
FIG. 13 is an exemplary screen display illustrating a state of a user interface in which payment information is entered, in accordance with the exemplary method of FIGS. 5A-C.

An exemplary display screen 156 is shown in FIG. 13 through which kiosk 12 can obtain payment by credit card from the user. That is, the user uses touchscreen 22 to enter the credit card holder name, the credit card number, and other information of the type commonly entered into on-line shopping systems that accept credit card payments. Display screen 156 also displays the contents of the user's shopping cart. Note that display screen 156 pertains to payment for one or more applications for permits to be issued by one or more permit-issuing jurisdiction, such as a city. Although credit card payment is described herein as an example, other forms of payment are contemplated, such as debit card payment, gift card payment, electronic bank transfer, etc. Similarly, although in the exemplary embodiment payment is provided through payment information entered on touchscreen 22, in other embodiments a kiosk may include a payment acceptor station that reads a magnetic stripe or similar data transfer element on a user's credit card or other payment device. As the procedures for obtaining and accepting an electronic payment in on-line shopping and in-store environments are well understood by persons skilled in the art, they are not described in further detail herein.

Following payment to that jurisdiction for those one or more permits, kiosk 12 may provide a similar display screen (not shown) pertaining to payment for one or more applications for permits to be issued by another permit-issuing jurisdiction, such as a county. Note that in display screen 156, graphical icon 142 indicates this payment stage of the checkout process.

In response to the user touching a Submit button 158, kiosk 12 transmits the permit application information, including the payment information received via display screen 156, to the pertinent permit system 16, as indicated by block 160 in FIG. 5. Thus, kiosk 12 can provide a single interface between the user and multiple on-line permit application systems of the multiple permit-issuing jurisdictions 16. Upon receiving the permit application information, the electronic permit application systems of the permit-issuing jurisdictions 16 can process the permit applications in essentially the same as they process permit applications received on-line through conventional Web interfaces or similar means. As the manner in which such conventional permit application systems operate is well understood in the art, this aspect is not described herein in further detail. In view of the descriptions herein, persons skilled in the art will readily be capable of interfacing kiosk 12 or similar devices with such known permit application systems to effect the exemplary methods described herein and others within the realm of the invention.

Figure 14:
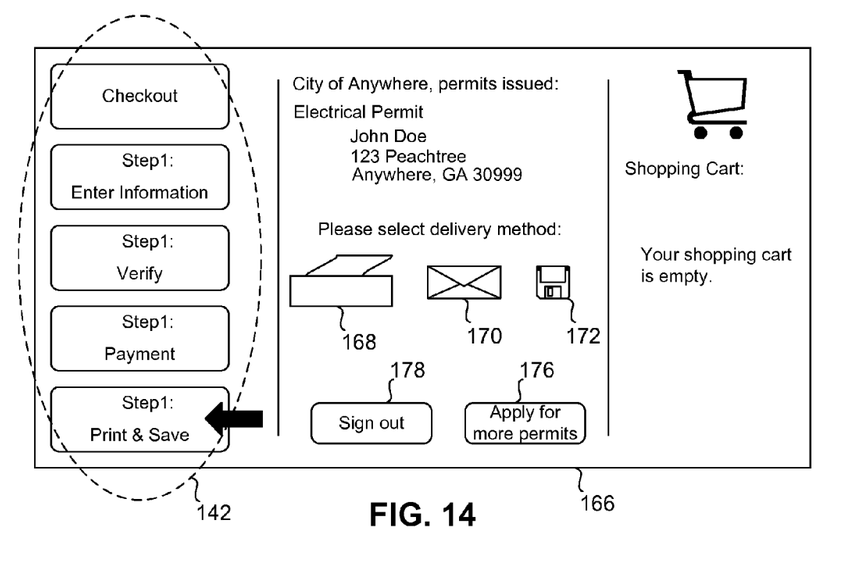
FIG. 14 is an exemplary screen display illustrating a state of a user interface in which a permit is output, in accordance with the exemplary method of FIGS. 5A-C.

As indicated by block 162, kiosk 12 can receive one or more permits in electronic format from the permit-issuing jurisdictions 16 that processed (and approved) the user's permit applications. As indicated by block 164, kiosk 12 can output the permits in electronic form. For example, the exemplary display screen 166 shown in FIG. 14 indicates each permit that was received and options for outputting it to the user. Respective icons 168, 170 and 172 indicate that the user may choose from among the options of having kiosk 12 print a hardcopy of the permit, having kiosk 12 initiate a procedure by which the pertinent jurisdiction 16 or a related party mails a hardcopy of the permit to the users (i.e., by postal service or similar service), or having kiosk 12 or the pertinent jurisdiction 16 or a related party download an electronic copy of the permit to a device operable by the user, such as a mobile phone, computer, or data storage device. As such procedures by which electronic or hardcopy documents can be delivered are well understood in the art, further details are not provided herein for purposes of clarity.

In conjunction with printing a hardcopy of the permit, kiosk 12 may generate a suggested list of materials and tools for the project and print the list for the user, as indicated by block 173.

After the permits have been delivered to the user, the user can choose to apply for additional permits, as indicated by block 174 in FIG. 5. For example, in response to the user touching a button 176 in display screen 166 (FIG. 14), kiosk 12 can return the method to the above-described block 80. Thus, a professional contractor can continue applying for additional permits for additional projects. In response to the user touching a Sign Out button 178, kiosk 12 logs the user out of the user's account and returns to the state described above with regard to display screen 66 of FIG. 6 and block 64 of FIG. 5.

While one or more embodiments of the invention have been described as illustrative of or examples of the invention, it will be apparent to those of ordinary skill in the art that other embodiments are possible that are within the scope of the invention. Accordingly, the scope of the invention is not to be limited by such embodiments but rather is determined by the appended claims.

What is claimed is:

1. A kiosk for obtaining a permit for a project, comprising:
   a user interface;
   a network interface coupled to a data network;
   a printer; and
   a processing system comprising a processor coupled to a memory, the processing system programmed or configured to:

receive a property address via the user interface;
   compare the property address with a plurality of geographic jurisdictions to determine one or more permit-issuing jurisdictions in which the property address is located;
   output permit requirement information corresponding to each of the one or more permit-issuing jurisdictions via the user interface;
   receive permit application information via the user interface in response to the permit requirement information, the permit application information including electronic payment information;
   transmit a permit application including the permit application information to at least one of the one or more permit-issuing jurisdictions via the data network;
   receive a permit from the at least one permit-issuing jurisdiction via the data network in response to the permit application, the network interface providing access via the data network to permit processing systems of a plurality of permit-issuing jurisdictions;
   provide the one or more permits via the user interface;
   receive project type information via the user interface;
   compare the project type information with project resource information for a plurality of project types to determine one or more project resources corresponding to the project type information;
   provide a list of the one or more project resources via the user interface, wherein the list of project resources includes at least one of a tool, a building material, or a fixture; and
   print the list of one or more project resources.

2. The kiosk of claim 1, wherein the processing system is further programmed or configured to:
   compare the project type information with permit type information for a plurality of project types to determine one or more required permit types corresponding to the project type information;
   wherein the permit requirement information corresponds to each of the one or more permit-issuing jurisdictions and each of the one or more required permit types.

3. The kiosk of claim 1, wherein the processing system is further programmed or configured to:
   query via the user interface whether a user is a licensed contractor; and
   receive contractor license information via the user interface when the user is a licensed contractor.

4. The kiosk of claim 3, wherein the processing system is further programmed or configured to compare the permit application information with permit type information for a plurality of permit types to determine whether a permit type corresponding to the permit application information can be issued to a user who is not a licensed contractor.

5. The kiosk of claim 1, wherein the processing system is further programmed or configured to:
   receive a permit history relating to at least one of the one or more permit-issuing jurisdictions via the data network; and
   provide one or more permit histories via the user interface, each permit history indicating permits previously issued for projects at the property address.

* * * * *